United States Patent Office 3,117,662
Patented Jan. 14, 1964

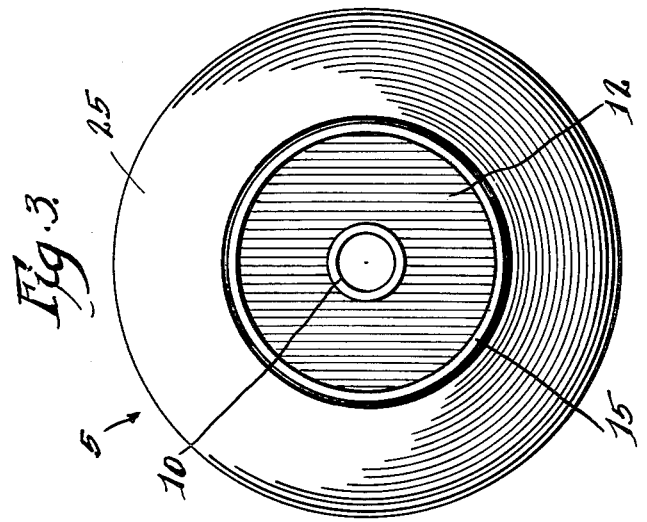
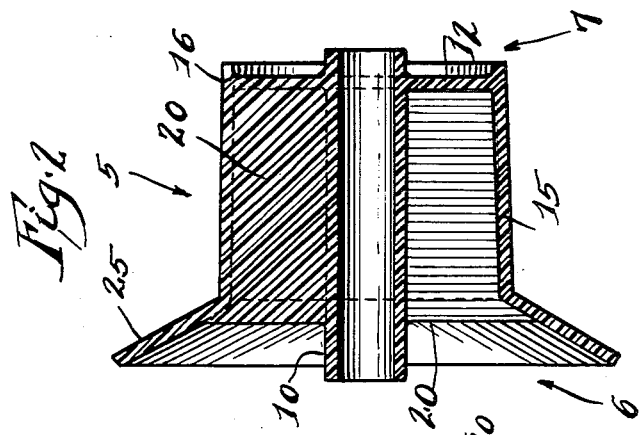
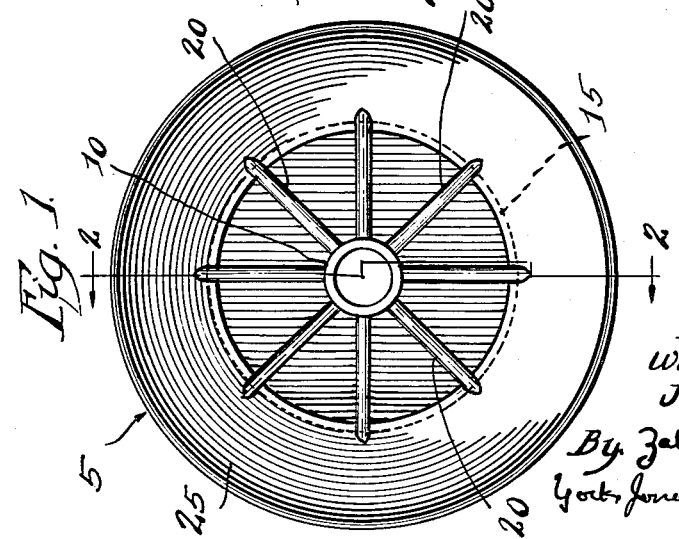
Inventors.
Warren P. Wahl.
John F. Wahl.

3,117,662
FLOW ROLLER
Warren P. Wahl and John F. Wahl, Sterling, Ill., assignors to Mallard Plastics Inc., Sterling, Ill., a corporation of Illinois
Filed May 25, 1962, Ser. No. 197,630
7 Claims. (Cl. 193—37)

This invention relates to a flow roller for use in conveying systems, particularly conveying systems of the gravity type. Such systems often are called flow conveyors.

At the present time flow conveyors are used extensively for the storage of inventory, particularly inventory which is packaged in boxes. Existing inventory is available conveniently at the front of the conveyor, and new inventory is loaded onto the conveyor at the rear. Thus, the inventory is used on a first in, first out basis, as is desirable.

Flow conveyors for inventory provide great savings in storage space. The conveyors may be stacked to any convenient height with minimum vertical spacing, and arranged side-by-side with no appreciable waste space in between. "Walk around" space is reduced to a minimum, it being necessary only to provide removal space at the front of the conveyors and loading space at the rear.

One object of the invention is to provide an improved flow roller for use in flow conveyors of the general type mentioned above.

Another object is to provide a flow roller of a thin-wall unitary construction which is capable of fabrication by a molding process or by die casting. The flow roller is preferably a plastic molded or a die cast part, and the thin-wall construction used requires a minimum amount of material, thereby contributing greatly to manufacturing economy.

Another object is to provide a flow roller of thin plastic material wherein the construction is such that there is adequate strength to resist the stresses imposed by loading. The structure and size of the roller are such that, despite the thin walls, the roller will not distort in use, either temporarily or permanently.

Still another object is to provide a flow roller of thin plastic material wherein the portion adapted to be contacted by conveyed articles has large area, thus to distribute the load and avoid distortion both in the roller and in the article conveyed, usually a paperboard box. This portion has large diameter for easy movement of conveyed articles onto the roller and also large width so as to be able to support articles having slight variation in width. Also, the roller portion adapted to engage and rotate on an axle has relatively small diameter, thus to provide a low-friction relationship between roller and axle.

Another object is to provide a flow roller formed of thin plastic material wherein the thickness of the plastic material is substantially uniform throughout, thereby minimizing distortions inherent in the molding process and the plastic material used.

Another object is to provide a large flow roller which is also light in weight so as to add minimum loading to the supporting structure.

Still another object is to provide a flow roller of thin plastic material which includes an integral flange at one end of the roller. The flange is effective both to reinforce the roller and to provide lateral guidance for articles conveyed on the roller.

Other objects, advantages and details of the invention will be apparent as the description proceeds, reference being had to the accompanying drawing wherein one form of the invention is shown. It is to be understood that the description and drawing are illustrative only, and that the scope of the invention is to be measured by the appended claims.

In the drawing:
FIG. 1 is an elevational view of the outer end of a flow roller embodying the invention.
FIG. 2 is a sectional view on irregular line 2—2 of FIG. 1.
FIG. 3 is an elevational view of the inner end of the flow roller.

Referring to the drawing, the illustrated flow roller is designated 5. Flow roller 5 preferably is of unitary construction, and formed of thin plastic material, for example molded nylon. It will be noted that all walls in the roller have generally the same thickness, a feature which minimizes distortions usually inherent in the plastic molding process.

For ease of description, the end of roller 5 shown in FIG. 1 will be referred to as outer or flanged end 6 and the end shown in FIG. 3 will be referred to as inner end 7. Outer end 6 and inner end 7 are respectively shown at the left and right in FIG. 2. As will be understood, outer end 6 is positioned adjacent the lateral edge of the conveyor in which the roller is used.

Roller 5 includes a central tubular portion 10 adapted to receive an axle and freely rotate thereon. Many plastics, such as nylon, have a self-lubricating characteristic which provides a low-friction relationship between portion 10 and an axle. Tubular portion 10 has a uniform inner diameter and, for ease in molding, may have a non-uniform outer diameter, the outer diameter decreasing slightly from inner end 7 of the roller to outer end 6.

A transverse disk portion 12, concentric with tubular portion 10, extends exteriorly from the tubular portion near the inner end of the tubular portion. As shown, disk portion 12 is integral with tubular portion 10. This disk portion provides reinforcement in the region of maximum loading.

A generally cylindrical portion 15, concentric with tubular portion 10, is somewhat less than axially coextensive with tubular portion 10. As shown, the inner end region 16 of cylindrical portion 15 is integral with the periphery of disk portion 12. For ease of molding, cylindrical portion 15 may have a slight taper. Thus the diameter thereof at inner end 7 of the roller may be slightly less than the diameter at the outer end.

A plurality of angularly spaced radial web portions 20 extend between tubular portion 10 and cylindrical portion 15. The web portions 20 preferably extend axially from disk portion 12 to a point past the outer end of cylindrical portion 15, thus supporting and reinforcing cylindrical portion 15 substantially throughout its length. In the form of the invention illustrated, there are eight web portions 20 at 45 degree spacings, as shown in FIG. 1. Rollers having only six webs have also been constructed and found to be satisfactory.

An exterior annular flange 25 is located at the outer end of cylindrical portion 15. As shown, flange 25 is conical in shape and extends axially beyond the outer end of the cylindrical portion and at an angle and of sufficient height to guide the articles being conveyed. If desired, flange 25 may approach right angular relation with cylindrical portion 15. The web portions 20 should extend at least partially into this flanged area.

It will be noted in FIG. 2 that the respective inner and outer ends of tubular portion 10 extend axially slightly beyond the inner end of cylindrical portion 15 and the outer end of annular flange 25. The projecting ends of tubular portion 10 thus serve as low-friction spacers which may engage supporting structure in which the roller is mounted and prevent the inner end of cylindrical portion 15 and the outer end of flange 25 from engaging such structure.

While the precise dimensions of the flow roller may vary, it is desirable in general for cylindrical portion 15 to have comparatively large diameter and tubular portion 10 to have comparatively small diameter. In the form of the invention shown, the diameter of cylindrical portion 15 is greater than four times the inner diameter of tubular portion 10.

The large diameter of cylindrical portion 15 insures that the roller will be contacted by a conveyed article over a large area, thereby preventing temporary or permanent distortions due to loading. The small diameter of tubular portion 10 cooperates to establish a low-friction relationship with an axle. The long length of the small diameter tubular portion gives adequate bearing so that heavy loads will not cause detrimental distortion of the inner wall of the tubular portion against an axle.

The illustrated roller is a practical embodiment of the invention, and it will be noted that the diameter of cylindrical portion 15 is of the same order as the length of tubular portion 10. In a commercial embodiment these dimensions respectively are 1.645" and 1.750". The thickness of the several plastic walls in the commercial roller falls in the 0.060"–0.070" range.

From the above description it is thought that the construction and advantages of this invention will be readily apparent to those skilled in the art. Various changes in detail may be made without departing from the spirit or losing the advantages of the invention.

Having thus described the invention, what is claimed as new and desired to secure by Letters Patent is:

1. A flow roller of unitary construction formed of thin plastic material, said flow roller comprising:
    a central tubular portion adapted to receive an axle and freely rotate thereon, said tubular portion having a uniform inner diameter and a non-uniform outer diameter, the outer diameter decreasing from the inner end of said portion to the outer end;
    a transverse disk portion concentric with said tubular portion and extending exteriorly therefrom near the inner end of said tubular portion;
    a generally cylindrical portion concentric with said tubular portion, the inner end region of said cylindrical portion integral with the periphery of said disk portion, the diameter of said cylindrical portion increasing slightly from the inner end of said portion to the outer end;
    a plurality of angularly spaced radial web portions extending between said tubular portion and said cylindrical portion, said web portions extending axially from said disk portion to the outer end of said cylindrical portion; and
    an exterior annular flange on the outer end of said cylindrical portion, the respective ends of said tubular portion extending axially slightly beyond the inner end of said cylindrical portion and the outer end of said annular flange, the diameter of said cylindrical portion substantially equal to the length of said tubular portion.

2. A flow roller of a thin-wall, unitary construction, said flow roller comprising:
    a central tubular portion adapted to receive an axle and freely rotate thereon;
    a transverse disk portion concentric with said tubular portion and extending exteriorly therefrom near the inner end of said tubular portion;
    a generally cylindrical portion concentric with said tubular portion, the inner end region of said cylindrical portion integral with the periphery of said disk portions;
    a plurality of angularly spaced radial web portions extending between said tubular portion and said cylindrical portion, said web portions extending axially from said disk portion to the outer end of said cylindrical portion; and
    an exterior annular flange on the outer end of said cylindrical portion, the respective ends of said tubular portion extending axially beyond the inner end of said cylindrical portion and the outer end of said annular flange.

3. The flow roller of claim 2 wherein the diameter of said cylindrical portion is large compared to the inner diameter of said tubular portion whereby the periphery of said cylindrical portion is adapted to be contacted by a conveyed article over a large area and said tubular portion is adapted to have low-friction relation with an axle.

4. The flow roller of claim 2 wherein the diameter of said cylindrical portion is at least four times the inner diameter of said tubular portion whereby the periphery of said cylindrical portion is adapted to be contacted by a conveyed article over a large area and said tubular portion is adapted to have low-friction relation with an axle.

5. A flow roller comprising:
    a central tubular portion of thin plastic material adapted to receive an axle and freely rotate thereon;
    a transverse disk portion concentric with said tubular portion and extending exteriorly therefrom near the inner end of said tubular portion;
    a generally cylindrical portion of thin plastic material concentric with said tubular portion and at one end engaging the periphery of said disk portion;
    a plurality of angularly spaced radial web portions extending between said tubular portion and said cylindrical portion; and
    an exterior annular flange on the outer end of said cylindrical portion, the respective ends of said tubular portion extending axially beyond the inner end of said cylindrical portion and the outer end of said annular flange.

6. The flow roller of claim 5 wherein the diameter of said cylindrical portion is of the same order as the length of said tubular portion and more than four times the inner diameter of said tubular portion.

7. A flow roller of a thin-wall, unitary construction, said flow roller comprising:
    a central tubular portion adapted to receive an axle and freely rotate thereon;
    a transverse disk portion concentric with said tubular portion and extending exteriorly therefrom near the inner end of said tubular portion;
    a generally cylindrical portion concentric with said tubular portion, the inner end region of said cylindrical portion integral with the periphery of said disk portion;
    a plurality of angularly spaced radial web portions extending between said tubular portion and said cylindrical portion, said web portions extending axially from said disk portion to the outer end of said cylindrical portion; and
    an exterior annular flange on the outer end of said cyindrical portion, said radial web portions being integral with at least a portion of said annular flange.

References Cited in the file of this patent
UNITED STATES PATENTS

| | | |
|---|---|---|
| 1,632,204 | Threefoot et al. | June 14, 1927 |
| 2,436,326 | Pierce | Feb. 17, 1948 |
| 2,572,276 | Moe | Oct. 23, 1951 |
| 3,037,603 | Kornylak | June 5, 1962 |